US009719862B2

(12) United States Patent  
Meyerson et al.

(10) Patent No.: US 9,719,862 B2  
(45) Date of Patent: Aug. 1, 2017

(54) TEMPERATURE-MEASUREMENT PROBE

(71) Applicant: Welch Allyn, Inc., Skaneateles Falls, NY (US)

(72) Inventors: Craig M. Meyerson, Syracuse, NY (US); David E. Quinn, Auburn, NY (US); John A. Lane, Weedsport, NY (US); Anthony P. Wagner, Auburn, NY (US); Matthew J. Kinsley, Liverpool, NY (US); Scott A. Martin, Warners, NY (US); Matthew D. Mullin, Memphis, NY (US)

(73) Assignee: Welch Allyn, Inc., Skaneateles Falls, NY (US)

(*) Notice: Subject to any disclaimer, the term of this patent is extended or adjusted under 35 U.S.C. 154(b) by 610 days.

(21) Appl. No.: 14/305,554

(22) Filed: Jun. 16, 2014

(65) Prior Publication Data

US 2014/0297215 A1 Oct. 2, 2014

Related U.S. Application Data

(63) Continuation of application No. 12/650,975, filed on Dec. 31, 2009.

(51) Int. Cl.
  *G01K 7/22* (2006.01)
  *G01K 1/02* (2006.01)
  (Continued)

(52) U.S. Cl.
  CPC .............. *G01K 7/22* (2013.01); *G01K 1/02* (2013.01); *G01K 1/022* (2013.01); *G01K 1/024* (2013.01);
  (Continued)

(58) Field of Classification Search
  CPC .................... G01K 7/22; G01K 1/02
  (Continued)

(56) References Cited

U.S. PATENT DOCUMENTS

| 3,491,596 A | 1/1970 | Dean |
| 3,592,059 A | 7/1971 | Chilton |

(Continued)

FOREIGN PATENT DOCUMENTS

| CN | 101124464 A | 2/2008 |
| EP | 1 486 763 A1 | 12/2004 |

(Continued)

OTHER PUBLICATIONS

Chinese Office Action and Search Report for CN 201080064279.X; dated: Jan. 4, 2015; 4 pages.

(Continued)

*Primary Examiner* — Lisa Caputo  
*Assistant Examiner* — Jamel Williams  
(74) *Attorney, Agent, or Firm* — Barclay Damon, LLP

(57) ABSTRACT

An apparatus, system and method for temperature measurement of a target site, such a human body site. The invention includes an intelligent temperature probe configured to physically contact a target site and to communicate with a host device, which can be implemented as a hand-held device or as a personal computer. The host device can compute, store and display an accurate predicted temperature, or an actual temperature at thermal equilibrium, of the target site for each of a plurality of different intelligent temperature probes that each have unique and varied operating characteristics. A set of unique operating characteristics for each temperature probe is represented by information communicated between each respective temperature probe and the host device.

20 Claims, 8 Drawing Sheets

(51) Int. Cl.
*G01K 7/42* (2006.01)
*G01K 13/00* (2006.01)

(52) U.S. Cl.
CPC ............. *G01K 7/42* (2013.01); *G01K 13/002* (2013.01); *Y10T 29/49117* (2015.01)

(58) Field of Classification Search
USPC ........................................................ 374/163
See application file for complete search history.

(56) References Cited

U.S. PATENT DOCUMENTS

| | | | |
|---|---|---|---|
| 3,681,991 A | | 8/1972 | Eberly, Jr. |
| 3,729,998 A | | 5/1973 | Mueller et al. |
| 3,791,214 A | | 2/1974 | Keith |
| 3,832,669 A | | 8/1974 | Mueller et al. |
| 3,832,726 A | | 8/1974 | Finelli |
| 3,832,902 A | | 9/1974 | Usami et al. |
| 3,878,724 A | | 4/1975 | Allen |
| 3,893,058 A | | 7/1975 | Keith |
| 3,915,003 A | | 10/1975 | Adams |
| 4,036,211 A | * | 7/1977 | Veth ................... A61B 5/02055 600/479 |
| 4,158,965 A | * | 6/1979 | Prosky ................... G01K 1/028 374/158 |
| 4,183,248 A | | 1/1980 | West |
| 4,204,429 A | | 5/1980 | Shimazaki et al. |
| 4,210,024 A | | 7/1980 | Ishiwatari et al. |
| 4,411,535 A | | 10/1983 | Schwarzschild |
| 4,464,725 A | | 8/1984 | Briefer |
| 4,466,749 A | | 8/1984 | Cunningham et al. |
| 4,475,823 A | | 10/1984 | Stone |
| 4,480,312 A | | 10/1984 | Wingate |
| 4,487,208 A | | 12/1984 | Kamens |
| 4,688,949 A | | 8/1987 | Hatakenaka |
| 4,713,783 A | | 12/1987 | Fletcher |
| H562 H | | 12/1988 | Trachier et al. |
| 4,790,324 A | | 12/1988 | O'Hara et al. |
| 4,901,257 A | | 2/1990 | Chang et al. |
| 4,932,789 A | | 6/1990 | Egawa et al. |
| 4,958,936 A | | 9/1990 | Sakamoto et al. |
| 5,015,102 A | * | 5/1991 | Yamaguchi .......... G01K 13/002 374/107 |
| RE34,507 E | | 1/1994 | Egawa et al. |
| 5,293,877 A | | 3/1994 | O'Hara et al. |
| 5,343,869 A | * | 9/1994 | Pross ................. A61B 5/02055 600/301 |
| 5,347,476 A | | 9/1994 | McBean, Sr. |
| 5,425,375 A | | 6/1995 | Chin et al. |
| 5,463,375 A | | 10/1995 | Bauer |
| 5,542,285 A | | 8/1996 | Merilainen et al. |
| 5,719,378 A | | 2/1998 | Jackson et al. |
| 5,720,293 A | | 2/1998 | Quinn et al. |
| 5,735,605 A | | 4/1998 | Blalock |
| 5,792,951 A | | 8/1998 | Ismail et al. |
| 5,857,777 A | * | 1/1999 | Schuh .................... G01K 15/00 374/170 |
| 5,967,992 A | | 10/1999 | Canfield |
| 6,000,846 A | | 12/1999 | Gregory et al. |
| 6,036,361 A | | 3/2000 | Gregory et al. |
| 6,109,784 A | | 8/2000 | Weiss |
| 6,139,180 A | | 10/2000 | Usher et al. |
| 6,146,015 A | | 11/2000 | Weiss |
| 6,161,958 A | | 12/2000 | Rattman et al. |
| 6,188,971 B1 | | 2/2001 | Kelly |
| 6,250,802 B1 | | 6/2001 | Dotan |
| 6,280,397 B1 | | 8/2001 | Yarden et al. |
| 6,304,827 B1 | | 10/2001 | Blixhavn et al. |
| 6,355,916 B1 | | 3/2002 | Siefert |
| 6,374,191 B1 | | 4/2002 | Tsuchiya et al. |
| 6,454,931 B2 | | 9/2002 | Patrick et al. |
| 6,485,433 B1 | | 11/2002 | Peng |
| 6,517,240 B1 | | 2/2003 | Herb et al. |
| 6,594,603 B1 | | 7/2003 | Eryurek et al. |
| 6,634,789 B2 | | 10/2003 | Babkes |
| 6,698,921 B2 | | 3/2004 | Siefert |
| 6,827,488 B2 | | 12/2004 | Knieriem et al. |
| 6,850,789 B2 | | 2/2005 | Schweitzer, Jr. et al. |
| 6,886,978 B2 | * | 5/2005 | Tokita ..................... G01K 1/16 374/134 |
| 7,223,014 B2 | * | 5/2007 | Lojen ..................... G01K 15/00 374/120 |
| 7,255,475 B2 | | 8/2007 | Quinn et al. |
| 7,314,310 B2 | | 1/2008 | Medero |
| 7,484,884 B2 | | 2/2009 | Lane et al. |
| 7,484,887 B2 | | 2/2009 | Shidemantle et al. |
| 7,519,499 B2 | * | 4/2009 | Skinner .................. G01B 21/02 340/686.1 |
| 7,892,179 B2 | | 2/2011 | Rieth |
| 8,133,176 B2 | * | 3/2012 | Porges ................. A61B 5/14551 600/300 |
| 2002/0099304 A1 | * | 7/2002 | Hedengren .............. A61B 5/01 600/549 |
| 2003/0002562 A1 | * | 1/2003 | Yerlikaya ............. G01K 13/002 374/208 |
| 2004/0019293 A1 | | 1/2004 | Schweitzer et al. |
| 2005/0018749 A1 | | 1/2005 | Sato et al. |
| 2005/0069925 A1 | | 3/2005 | Ford et al. |
| 2005/0114166 A1 | * | 5/2005 | Nishimura ......... G06Q 30/0601 705/26.1 |
| 2007/0242726 A1 | | 10/2007 | Medero |
| 2007/0276283 A1 | * | 11/2007 | Hung .................. A61B 10/0012 600/551 |
| 2008/0043809 A1 | * | 2/2008 | Herbert .................. G01K 1/026 374/163 |
| 2009/0285260 A1 | * | 11/2009 | Stone ...................... G01K 1/16 374/164 |
| 2010/0322282 A1 | * | 12/2010 | Lane ...................... G01J 5/0022 374/121 |
| 2011/0118623 A1 | * | 5/2011 | Nakanishi ............ G01K 13/002 600/549 |

FOREIGN PATENT DOCUMENTS

| | | |
|---|---|---|
| JP | 54025882 | 2/1979 |
| JP | 59184829 | 10/1984 |
| JP | 2140923 | 12/1984 |
| JP | 61296224 | 12/1986 |
| JP | 61296225 | 12/1986 |
| JP | 61296226 | 12/1986 |
| JP | 62069128 | 3/1987 |
| JP | 1189526 | 7/1989 |
| JP | 9203705 | 3/1992 |
| KR | 1020080002761 | 1/2008 |
| WO | WO 03/002965 A1 | 1/2003 |

OTHER PUBLICATIONS

Supplementary European Search Report for EP 10841469.9; Search Completed Dec. 11, 2015; 10 pages.
Australian Patent Examination Report for AU 2010337180; dated Dec. 2, 2013; 3 pages.
Chinese Office Action for CN 201080064279.X; dated Jan. 6, 2014; 4 pages.
International Search Report/Written Opinion for PCT Application No. PCT/US2010/059674; mailed Aug. 17, 2011; 9 pages.

* cited by examiner

```
unsigned Temp_predict_procedure ()                                  470
{
  unsigned coefficient_one = 0.45;      /* 474a */
  unsigned coefficient_two = 2.15;      /* 474b */
  unsigned coefficient_three = 0.38;    /* 474c */
  unsigned coefficient_four = 1.12;     /* 474d */ unsigned Temp_predict = 0;            /* 476a */
  unsigned time_zero = 0;               /* 476b */
  unsigned time_one = 0.5;              /* 476c */
  unsigned time_two = 1.5;              /* 476d */
                                                              /* 480 */
  Temp_predict=((cmd_temp (time_zero)* coefficient_one) +
coefficient_two)-
         ((cmd_temp (time_one) + cmd_temp (time_two))* coefficient_three) -
                              coefficient_four);
     return (Temp_predict);
}
```

FIG.4C

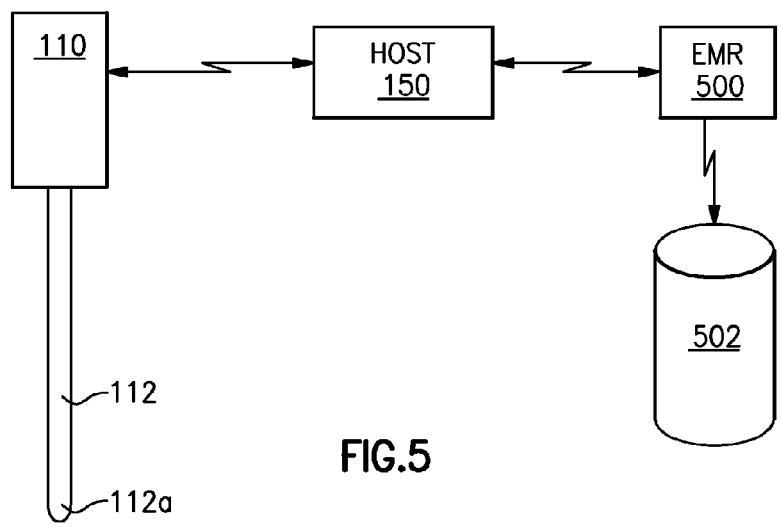

FIG.5

TEMPERATURE-MEASUREMENT PROBE

CROSS REFERENCE TO RELATED APPLICATIONS

This application is a continuation of prior U.S. patent application Ser. No. 12/650,975, filed on Dec. 31, 2009, the entire disclosure of which is incorporated herein by reference. This patent application further includes subject matter that appears related to the subject matter that is included within U.S. Pat. No. 7,255,475, that is titled "Thermometry Probe Calibration Method", and that was issued Aug. 14, 2007. The aforementioned patent is herein incorporated by reference in its entirety.

FIELD OF THE INVENTION

This invention relates to an apparatus, system and method for measurement of a temperature of a target site, such as a human body site. The invention includes an intelligent probe having a set of unique operating characteristics and that is configured to physically contact a target site and to communicate with a host device that can be implemented as a hand-held device or as a personal computer.

BACKGROUND OF THE INVENTION

A predictive thermometer includes a probe tip that is placed in physical contact with a target site, such as a human body site, for the purpose of measuring a temperature of that target site. A temperature of the target site is predicted (estimated) via real time analysis of a temperature rise of the probe tip prior to arriving at thermal equilibrium in relation to the target site. The probe tip may be pre-heated to a pre-determined temperature before temperature estimation. Variations in the manufacture of the predictive thermometer may cause inaccuracies with respect to the estimating the temperature of the target site.

SUMMARY OF THE INVENTION

The invention provides for an apparatus, system and method for measurement of a temperature of a target site, such a human body site. The invention includes an intelligent probe that is configured to physically contact a target site and to communicate with a host device that can be implemented as a hand-held device or as a personal computer. The host device, such as a personal computer, can compute, store and display an accurate predicted temperature, or a measured temperature at thermal equilibrium of the target site. The host device is configured to interface with and adapt to each of a plurality of different intelligent temperature probes that each have unique and varied operating characteristics. A set of unique operating characteristics for each temperature probe is represented by information including a procedural model that is communicated between each respective temperature probe and the host device.

BRIEF DESCRIPTION OF THE DRAWINGS

The objects and features of the invention can be better understood with reference to the claims and drawings described below. The drawings are not necessarily to scale, and the emphasis is instead generally being placed upon illustrating the principles of the invention. Within the drawings, like reference numbers are used to indicate like parts throughout the various views. Differences between like parts may cause those like parts to be each indicated by different reference numbers. Unlike parts are indicated by different reference numbers.

FIG. 4C illustrates an embodiment of a programming script 470 that represents a procedure constructed in accordance with temperature correlation information.

FIG. 5 illustrates information exchange between the temperature probe, a host device and an electronic medical records system.

DETAILED DESCRIPTION OF THE INVENTION

Figure 1A:
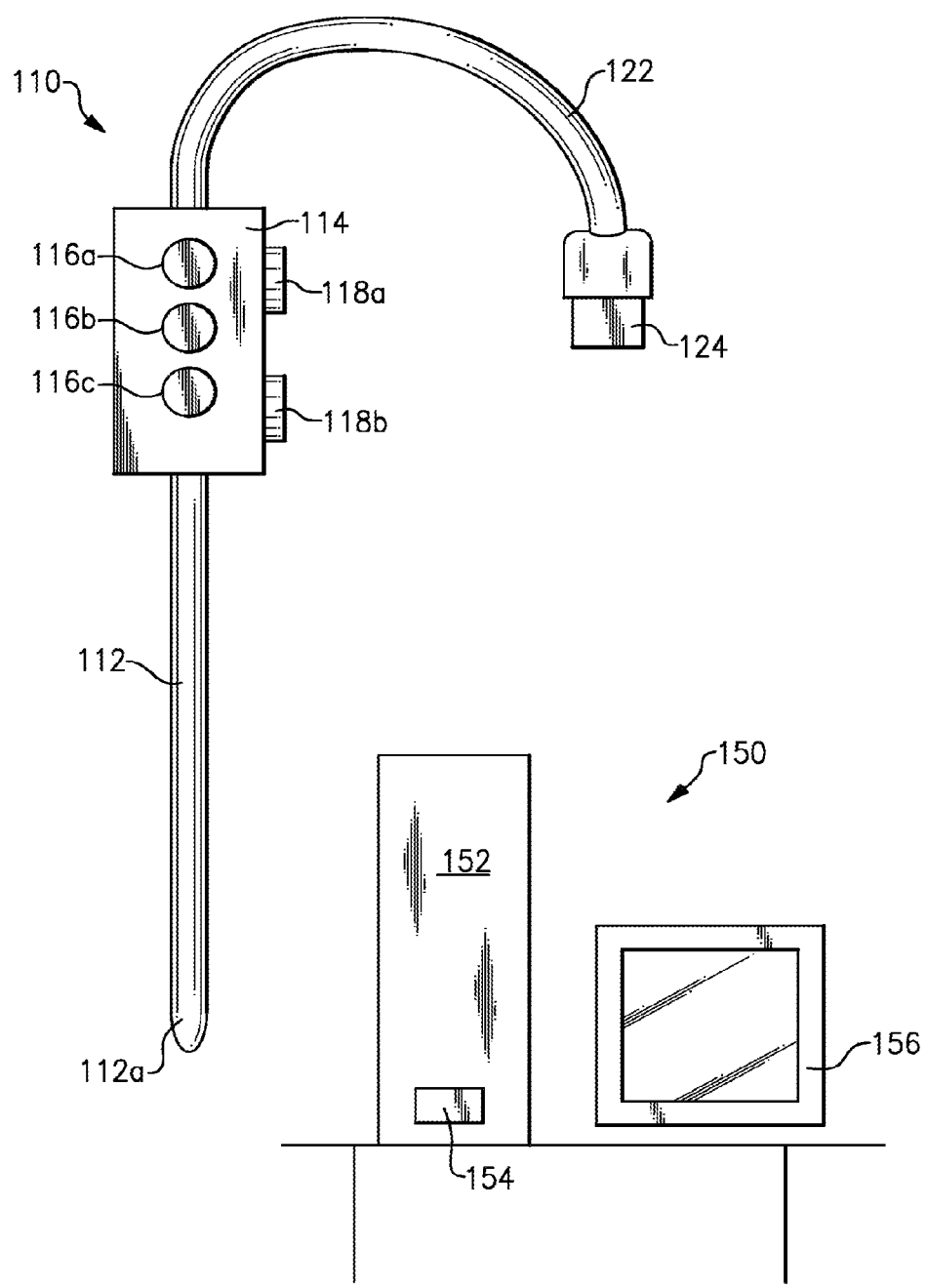
FIG. 1A illustrates a first embodiment of a hand held and universal serial bus powered temperature-measurement probe device and a host device that is implemented as a personal computer.

FIG. 1A illustrates a first embodiment of a hand held and universal serial bus powered temperature-measurement probe device 110 and a host device 150 that is implemented as a personal computer. The temperature-measurement probe device 110, also referred to as a device 110, includes a probe portion 112, a handle portion 114, a power and data connection cable 122 and a power and data connector 124.

The probe portion 112, also referred to as a probe body 112, is an elongated member that is designed to be placed in physical contact with a target location, such as in contact with a human body site. The probe tip 112a is preferably made from temperature sensitive material, for example made from a metal alloy including such as stainless steel or aluminum. The probe portion 112 includes a probe tip 112a at a distal end located farthest from the handle portion 114 of the device 110.

The handle portion 114 is designed to be held within a hand of a user of the device 110. As shown, the handle portion includes a plurality of one or more visual indicators 116a-116c and a plurality of one or more buttons 118a-118b. In some embodiments, a visual indicator 116a-116c is implemented as a light emitting diode (LED).

The power and data connector 124, which is also referred to as the connector 124, is a male universal serial bus (USB) connector. The power and data connection cable 122, also referred to as the cable 122, provides for electronic communication between the handle portion 114 and the connector 124. In some embodiments, the connector 124 is designed to engage a female USB connector, such as the female USB connector 154 that resides within a chassis 152 of a personal computer 150. In other embodiments, the cable is implemented as a serial or parallel bus in accordance with standards other than USB.

The device 110 includes a first electronic circuit path (circuit segment) (not shown), also referred to herein as a "path", having one or more electrical characteristics that are sensitive to and can be mapped to a temperature of a target site, referred to as a target temperature. A circuit path (path) can be implemented as a collection of electrical circuitry and/or other technology to achieve the functions described herein. The first circuit path includes a thermistor that functions like an electrical resister. The electrical resistance of the thermistor is a function of the temperature of the thermistor, while the temperature of the thermistor is a function of a probe temperature at a location 112a within the probe body. Likewise, the probe temperature is itself a function of the target temperature. The target temperature is a temperature at a target site location (See FIG. 2), which is typically a human body site. In other embodiments, other temperature sensitive components, such as a thermopile, are employed.

The first circuit path includes a memory that is configured to store temperature correlation information, also referred to as temperature-correlation data. The temperature correlation information represents a correlation between the electrical characteristics of the first circuit path and the probe temperature and a target temperature at a point in time. Circuit-measurement data represents the electrical characteristics of the first circuit as measured with respect to time. The circuit-measurement data typically measures the electrical characteristics over a period of time that is approximately 5 minutes or less in duration. In some embodiments, circuit-measurement data measures an electrical resistance of the thermistor of the first circuit path over time. Optionally, the memory can also store one or more instances of circuit-measurement data in addition to the temperature-correlation data.

The first circuit path includes at least one or more communications nodes (not shown) that are configured for communication of information (data) to a second circuit path (circuit segment) that resides outside of the device 110. In the embodiment shown, the communications node (not shown) electrically connects the first circuit path with the cable 122. As a result, information stored in the memory of the first circuit path is communicated via the communications node, the cable 122 and the USB connector 124 to the second circuit path residing outside of the device 110.

In the embodiment shown, the second circuit path (not shown) resides within the personal computer 150 and the information stored in memory of the first circuit path is further communicated to the second circuit path through the male USB connector 124 and female USB connector 154.

The second circuit path is configured to receive the temperature correlation information that is communicated from the first circuit path of the device 110. The second circuit path is also configured to measure and/or receive the electrical characteristics (circuit-measurement data) of the first circuit path in order to perform an estimation of the target temperature while employing the temperature-correlation data.

In some embodiments, the temperature correlation information includes a definition of a procedural model that correlates the electrical characteristics with the target temperature. The procedural model factors characteristics of each particular device 110 with respect to its particular design and to its particular manufacture. These characteristics include electrical and thermal characteristics of the device 110. Each particular manufacture of a device 110 is associated with manufacturing specific factors, for example, the amounts of bonding adhesives/epoxy used within the device 110 can significantly affect the rate of temperature change that is being sensed by the apparatus.

In some embodiments, the probe includes a heater (See FIG. 2), also referred to as a probe heater, that is located within the probe tip 112a. The probe heater is designed to generate heat in order to elevate the probe temperature to a predetermined temperature value. The predetermined temperature value is selected to equal a temperature value less than an expected target temperature value. With respect to a target being a human body site, the target temperature would be expected to be equal to or greater than 98 degrees Fahrenheit. In some embodiments, when the probe temperature attains the predetermined value, a visual indicator 116a activates to indicate a ready state for the device 110. When activating, the visual indicator 116a-116c projects light of a predetermined color, for example of a green color, to indicate that the probe is fully heated to the predetermined temperature and that the device is ready for estimating a target temperature of a target site. Hence, one of the visual indicators 116a-116c can be assigned to function as probe heating complete indicator.

In typical use, the probe tip 112a is placed in physical contact with a target site and heat from the target site flows into the probe tip 112a. As the heat flows, the probe temperature increases over time. A temperature measurement procedure inputs (samples) the probe temperature at a predetermined frequency over time and algorithmically determines an estimated target temperature prior to the occurrence of thermal equilibrium. The estimated target temperature is also referred to as a predicted target temperature.

The temperature measurement procedure is implemented as digital logic that resides within electronic circuitry residing within the device 110 or within the host 150. In some embodiments, the digital logic is implemented as software that is stored in the memory and that directs the operation of a processor (CPU) 314 (See FIG. 3A). An amount of time required to determine a predicted target temperature is typically less than one minute. An amount of time required to reach thermal equilibrium typically about 5 minutes. While determining a predicted target temperature, the frequency of probe temperature sampling is at least one sample per second.

Upon the device 110 determining a predicted target temperature, if the probe remains in physical contact with the target site, the probe temperature will continue to elevate until reaching thermal equilibrium. Upon reaching thermal equilibrium, the value of the probe temperature approximates the value of the target temperature. The value of the probe temperature at thermal equilibrium is also referred to as the manual complete or monitor complete temperature of the target site.

The temperature measurement procedure includes a circuit-measurement data acquisition portion and a temperature prediction portion. Circuit-measurement data is obtained and then processed to determine an estimated (predicted) temperature of the target site 230 before reaching thermal equilibrium. In some embodiments, the device 110 activates a visual indicator 116a-116c to project light, optionally of a particular color, for example of a blue color, to indicate that the data acquisition portion of the temperature measurement procedure is complete. Hence, one of the visual indicators 116a-116c can be assigned to function as a data acquisition complete indicator.

Figure 1B:
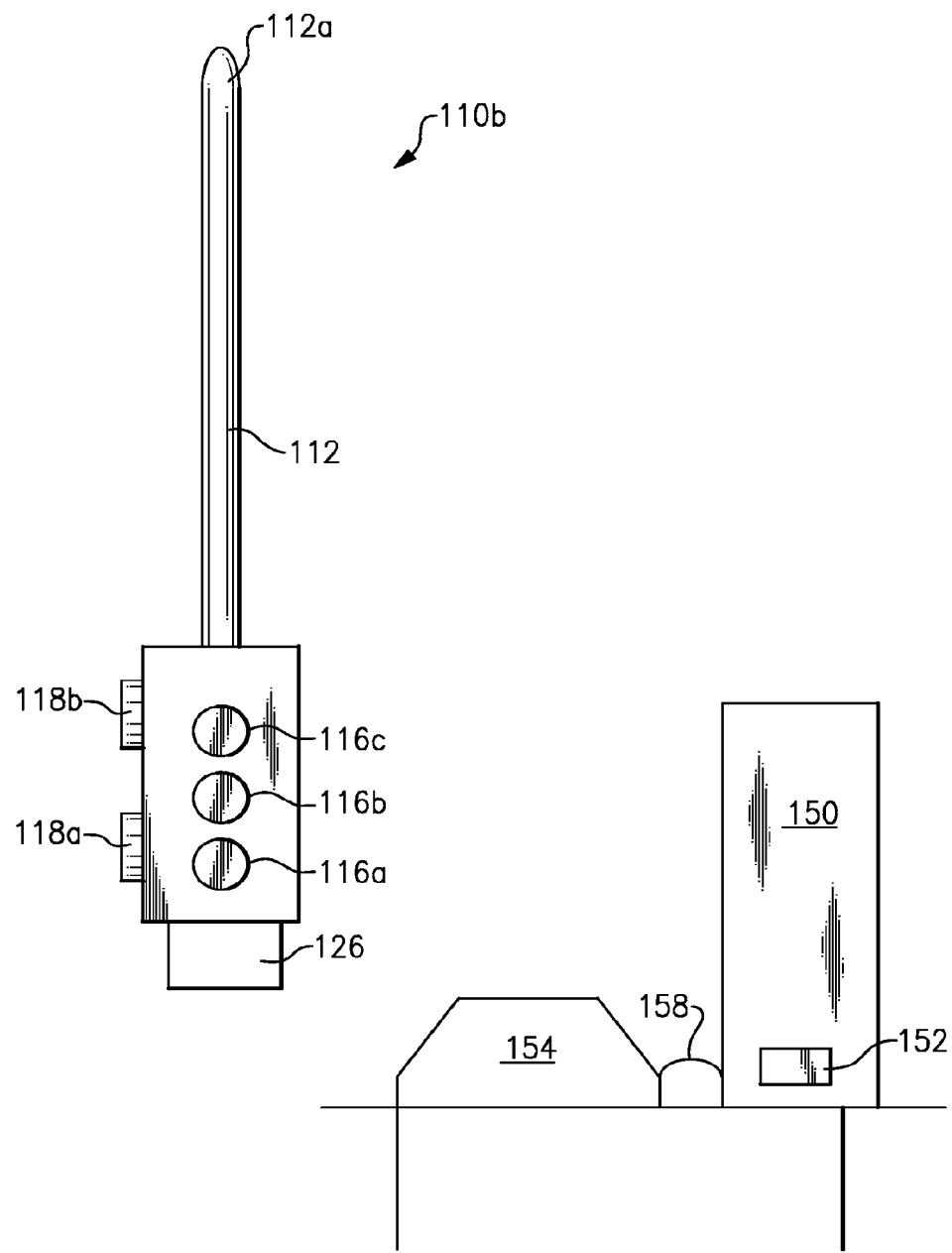
FIG. 1B illustrates a second embodiment of the temperature-measurement probe that is designed to attached into a probe cradle.
Figure 1C:
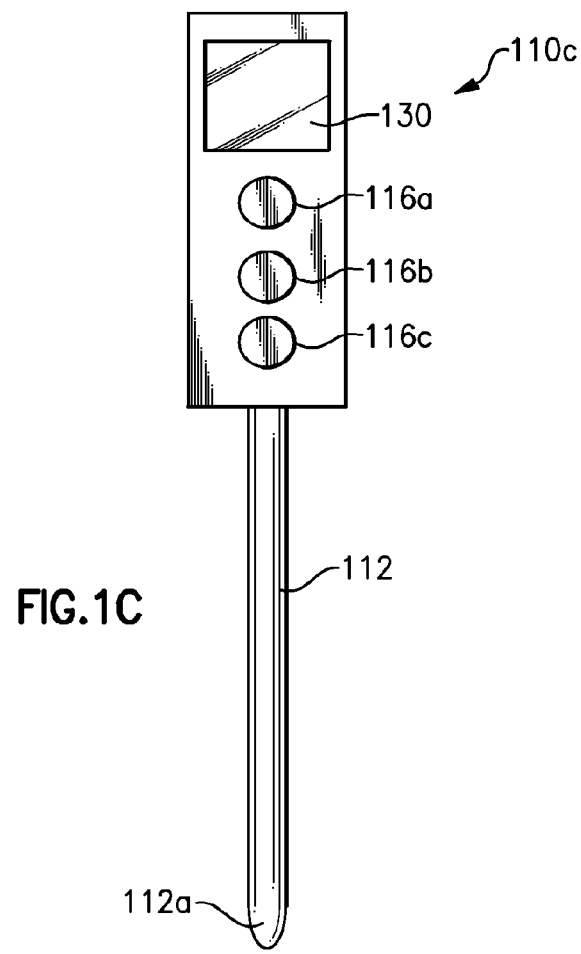
FIG. 1C illustrates a third embodiment of the temperature-measurement probe that is designed to compute and display a predicted measured temperature.

Likewise, another visual indicator 116a-116c is activated to indicate that the temperature prediction portion is complete, for embodiments where the probed device 110 performs temperature prediction without assistance of the host device 150 (See FIG. 1C). Likewise, where a temperature is measured at thermal equilibrium, another visual indicator 166a-116c is activated to indicate that the temperature measurement at thermal equilibrium is complete. Hence, one of the visual indicators 116a-116c can be assigned to function as a thermal equilibrium complete indicator.

In some scenarios, while determining a predicted target temperature, the device 110 is electrically connected to the host 150 via the connection cable 122. In this use scenario, the host 150 receives the temperature correlation information from the device 110 and receives the circuit-measurement data associated with the predicted target temperature. The host 150 processes the circuit-measurement data in combination with the temperature correlation information in order to determine the predicted target temperature. The predicted target temperature is displayed via the user interface display monitor 156, also referred to as a user interface 156 or display 156.

In other use embodiments, the device 110 is charged with electrical power that is received through the connection 122 and detached from the host 150 and placed in physical contact with a target site. Upon obtaining sufficient circuit-measurement data to determine a predicted and/or a thermal equilibrium temperature, the device 110 is attached to, and the circuit-measurement data and temperature correlation are communicated to, the host 150 for determination and display of the predicted and/or thermal equilibrium temperature.

In the above embodiments, the device 110 includes a wireline (wired) communications node (See FIG. 3A-3C) that enables the device to communicate with the host 150 via the connection cable 122. In other embodiments, the device 110 instead includes a wireless communication node that communicates with a host 150 via a wireless communications channel.

FIG. 1B illustrates a second embodiment of the temperature-measurement probe device 110 that is designed to attached into a probe cradle 154. As shown, the probe cradle 154 is electrically connected to a personal computer 150 via a communications cable 158. The device 110b includes a connector 126 that is designed to be inserted into an upper side of the probe cradle 154. Upon being inserted, the device 110 electrically attaches to the probe cradle 154 for transfer of power and data between the host 150 and the device 110b via a communications channel established by the probe cradle 154 and communications cable 158.

Digital logic residing within the device 112 detects attachment to the probe cradle 154 and detachment from the probe cradle 154. In some embodiments, upon detachment of the device 110b from the probe cradle 154, the device 110b can initiate the heater and/or the execution of the temperature prediction algorithm separate from the pressing of any button 118a-118b. Upon attachment of the device 110b to the probe cradle 154, the device 110b communicates any circuit-measurement data and temperature correlation information to the host 150 via the probe cradle 154.

FIG. 1C illustrates a third embodiment 110c of the temperature-measurement probe 110c that is designed to compute and display a predicted measured temperature. As shown, a handle portion of the device 110c includes a small display screen 130. The display screen 130 is designed to display a predicted or thermal equilibrium temperature as determined by the device 110c. This embodiment of the device 110c obtains the circuit-measurement data and further determines a predicted or thermal equilibrium temperature using the temperature correlation information.

In other embodiments, the host device 150 is implemented as a portable personal computer based device, such as a hand carriable (laptop) or as a hand held computing device. In yet other embodiments, the host device 150 is implemented as a customized temperature estimation device, like that shown as the hand held apparatus (figure reference 10) of FIG. 1 of the U.S. Pat. No. 7,255,475 referred to above and also referred to as the '475 patent. As shown in the '475 patent, the probe is configured to establish a physical connection to the temperature estimation apparatus (device). Unlike that shown in the '475 patent, the probe of the invention described herein is connected to the hand held apparatus via a universal serial bus connection. Like the probe of the '475 patent, probe of the invention described herein can be implemented as being removably attachable to the host 150 regardless of how the host 150 is implemented.

Figure 2:
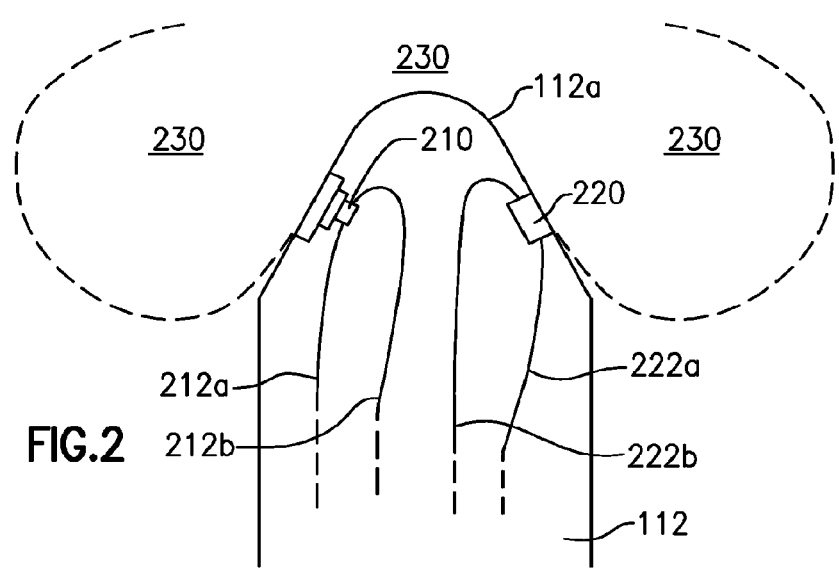
FIG. 2 illustrates an interior of the temperature-measurement probe of FIGS. 1A and 1B.

FIG. 2 illustrates an interior view of the distal end temperature-measurement probe of FIGS. 1A, 1B and 1C. As shown, the interior of the distal end (tip) 112a of the temperature-measurement probe includes a thermistor 210 and a heater 220 that are each disposed adjacent to an inside wall of the probe tip 112a.

The thermistor 210 functions like an electrical resister and inputs electrical current via electrical circuit segment 212a and outputs electrical current via electrical circuit segment 212b. The electrical resistance of the thermistor is a function of the temperature of the thermistor, and which is a function of the target temperature at the target site location 230. The target site location 230 is typically a collection of tissue of a human body site.

The heater 220 inputs electrical current via electrical circuit segment 222a and outputs electrical current via electrical circuit segment 222b. Electrical current passing through the heater 220 generates heat and raises the temperature of the probe tip 112a. The heater 220 operates until the thermistor 210 indicates that the temperature of the thermistor 210 has arrived at a predetermined target temperature.

Figure 3A:
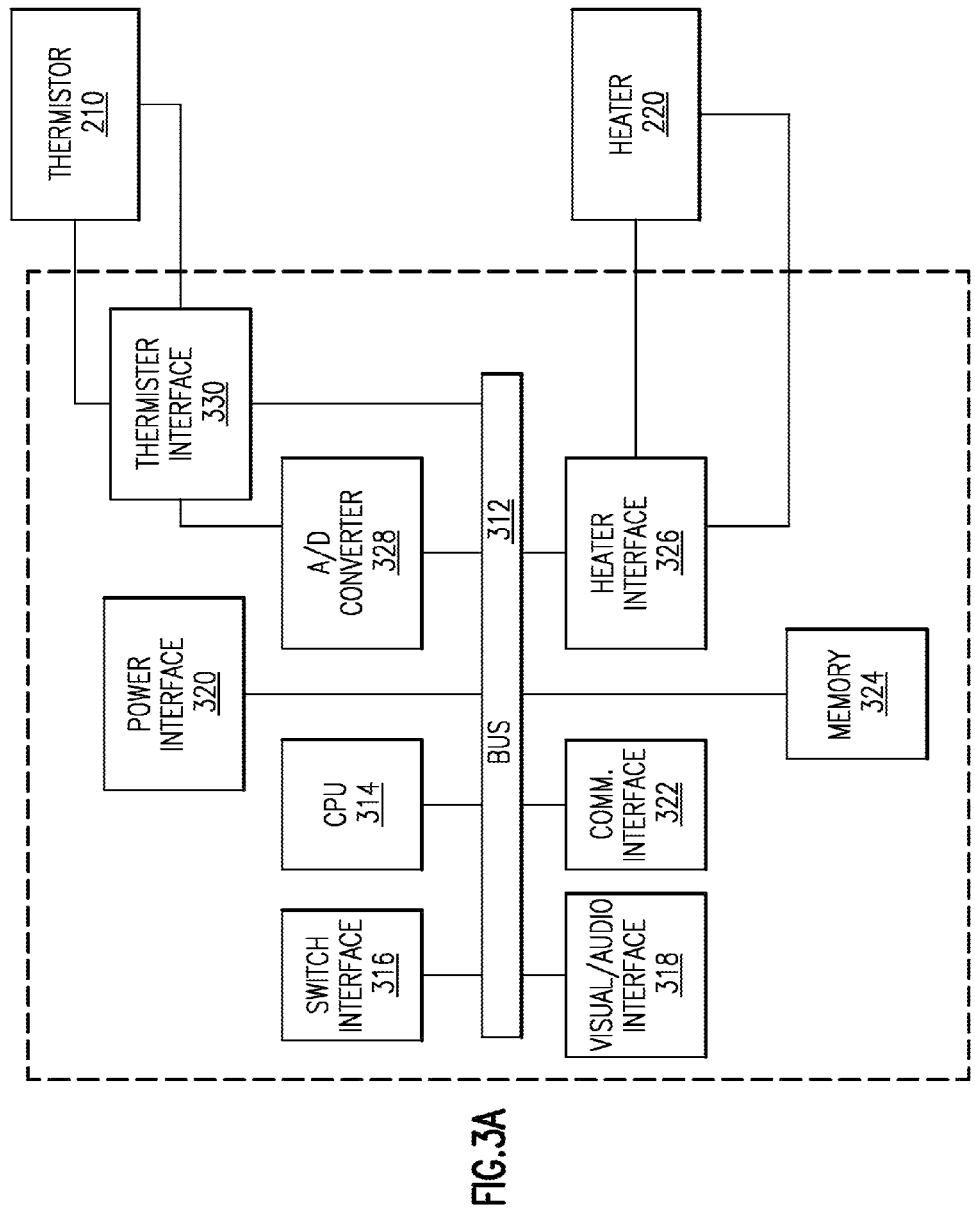
FIG. 3A illustrates a conceptual block diagram of core electronic circuitry residing within the temperature-measurement probe of FIGS. 1A and 1B.

FIG. 3A illustrates a conceptual block diagram of core electronic circuitry residing within the temperature-measurement probe 112 of FIGS. 1A-1C and 2. As shown, a central processing unit (CPU) 314, also referred to as a processor 314, is attached to a system bus 312. The system bus enables the CPU 314 to interface with other components that are also attached to the system bus 312. These other components include a switch interface 316, a visual/audio interface 318, a power interface 320, a communications interface 322, a memory 324, a heater interface 326, an analog to digital (A/D) converter 328 and a thermistor interface 330.

The switch interface 316 is designed to detect and communicate an event associated with the device 110. For example, the switch interface 316 detects a button press event associated with at least one button 118a-118b. Also, the switch interface 316 detects an attachment or detachment event between the device 110 and the cradle 154. The device 110 can be configured to take action, such as initiate operation of the heater 220 or to initiate execution of the temperature prediction algorithm, upon the press of a button 118a-118b or upon detachment of the device from the cradle 154. Initiation of electrical charging of the device 110 occurs upon attachment of the device to the cradle 154.

The visual/audio interface 318 is designed to communicate with the user of the device 110. For example, if and when operation of the heater 220 is initiated, a visual and/or audio indication is communicated to the user. In some embodiments, a light emitting diode 116a-116c emits light to indicate operation of the heater 220. Optionally, an audible sound is emitted to indicate the operation of the heater 220. Likewise, a visual and/or audio indication is communicated to the user to indicate arrival of the device 110 at a target temperature, termination of the heater 220 operation, determination of a predicted temperature and/or determination of a thermal equilibrium temperature.

The communication interface 322 enables communication of information between the device 110 and the host 150. The communication can be via the connection cable 122, via the cradle 154 (if applicable) or via a wireless communication channel (if applicable). The information that is communicated includes the temperature correlation information and circuit-measurement data.

The communications interface acts as an interface to a communications node. In some embodiments, the communications node is implemented to communicate via a wireline communications channel, such as implemented with universal serial bus (USB) technology. In other embodiments, the communications node is implemented to communicate via a wireless communications channel, and is implemented via wireless communication technology, that is designed in accordance with IEEE 802.11, IEEE 802.15 or Zigbee 802.15.4 communication standards, for example.

The memory 324 stores the temperature correlation information and circuit-measurement data along with software. The software includes CPU instructions and data that control the operation of the device 110. The software directs the CPU 314 to send commands to, and to receive status information from, the other components that are attached to the system bus 312.

The power interface 320 supplies electrical power to the device 110. The electrical power can be supplied via the connection cable 122, via the cradle 154 (if applicable) or via a capacitor (not shown). Embodiments that include a capacitor enable charge of the capacitor while attached to the host 150 via the connection cable 122 or attached to the host via the cradle 154. The capacitor enables the device 110 to be powered while detached from the host 150 and the cradle 154 (if applicable).

The heater interface 326 enables the CPU 314 to control operation of the heater 220. In some embodiments, the heater interface 326 is enabled as a port within a single chip microcomputer. The CPU 314 writes commands into a port register that directs heater interface circuitry to supply current to the heater 220. The heater 220 generates heat in order to raise the temperature of the probe 122 until it arrives a predetermined temperature.

The thermistor interface 330 enables the CPU 314 to control operation of the thermistor 210. In some embodiments, the thermistor interface 330 is enabled as a port within a single chip microcomputer. The CPU 314 writes commands into a port register that directs thermistor interface circuitry to supply a fixed electrical current to, or fixed voltage across, the thermistor 210.

In some embodiments, the thermistor interface 330 supplies a fixed current to the thermistor 210. An analog to digital converter 328 while interoperating with the thermistor interface 330, is used to measure a differential voltage across the thermistor 210. The amount of current flowing through the thermistor 210 in combination with the measured differential voltage is used to determine the resistance (Resistance=Voltage/Current) of the thermistor 210 at a point in time.

In other embodiments, the thermistor applies a fixed voltage across the thermistor 210 in order to measure the electrical current passing through the thermistor 210. A measured amount of electrical current flowing through the thermistor 210, in combination with the fixed voltage, indicates the resistance of the thermistor 210 at a point in time.

Some embodiments of the invention do not include all of the aforementioned components.

FIG. 3B-3E illustrate conceptual block diagrams of embodiments of power and communications circuitry for the temperature-measurement probe device 110.

Figure 3B:
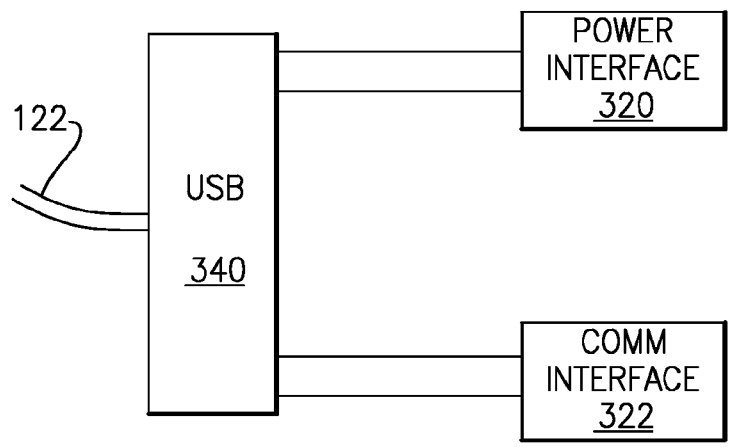
FIG. 3B-3E illustrate conceptual block diagrams of optional circuitry residing within the temperature-measurement probes of FIGS. 1A and 1B.

FIG. 3B illustrates an embodiment of the device 110 that is powered via a universal serial bus (USB) interface 340. The USB interface 340 includes electronic circuitry that resides within the device 110 and that is electrically attachable to the host 150 via the USB connection cable 122. The USB interface 340, also referred to as the USB hardware 340, is designed to transfer electrical power and data between the device 110 and the host 150 while electrically attached to the host 150 via the USB connection cable 122. Electrical power transfers from the host 150 via the connection cable 122 to the USB interface component 340. Data is transferred from the device 110 via the USB interface component 340 and via the USB connection cable 122 to the host 150, and from the host 150 to the device 110 via the same electrical path.

Figure 3C:
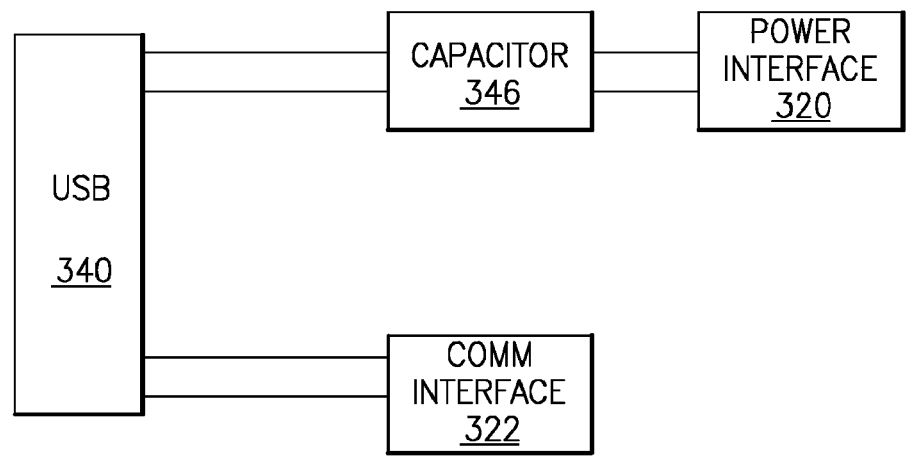

FIG. 3C illustrates the embodiment of FIG. 3B further including an electrical capacitor 346. The capacitor 346 enables the device 110 to operate while being electrically detached from the host device 150. Electrical power that is supplied via the USB interface 340 is employed to supply electrical charge to the capacitor 346. Upon supplying a sufficient electrical charge to the capacitor 346, the device 110 is detached from the host device 150 via detachment of the USB connection cable 122 from the host device 150. The user of the probe device 150 is then free to move the device 110 farther away from the host device 150 in order to physically contact the device 110 with a target site associated with a human target. Electrical charge stored within the capacitor 346 enables the device 110 to perform heating and to, at least, gather circuit-measurement data during physical contact with a target-set location. The device 110 can further perform a predicted temperature or thermal equilibrium temperature determination.

In some use scenarios, the device 110 can obtain multiple sets of circuit-measurement data associated with multiple physical contacts with one target or with multiple targets before re-attaching the probe device to the host device 150. The circuit-measurement data, in combination with the temperature-correlation data, is transferred to the host device for storage and processing into one or more temperature values. Those temperature values may be predicted and/or at thermal equilibrium.

Figure 3D:
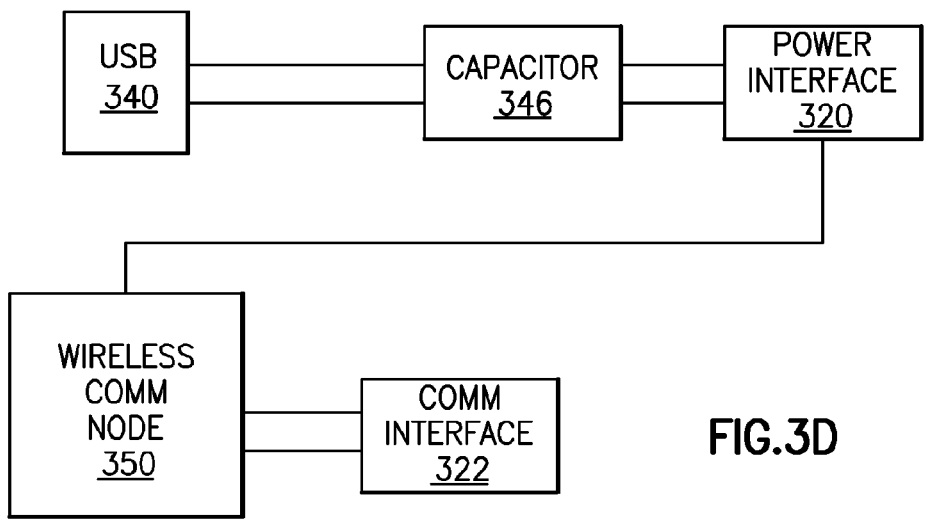

FIG. 3D illustrates the embodiment of FIG. 3C further including a wireless communications node 350. The wireless communications node 350 enables the device 110 to communicate with the host device 150 without being electrically attached to the host device via the connection cable 122. The capacitor 346 supplies electrical power to the wireless communications node 350 via the power interface 320. In some embodiments, the wireless communications node 350 establishes a wireless communications channel with the host device 150 in accordance with IEEE 802.11, IEEE 802.15 and Zigbee 802.15.4 communication standards.

Figure 3E:
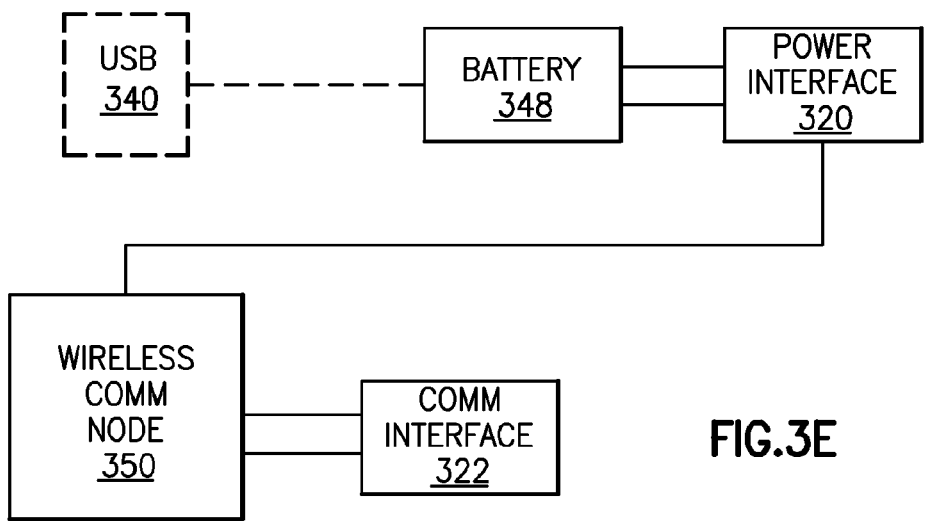

FIG. 3E illustrates an embodiment of the device 110 that includes a battery 348 and a wireless communications node. Like the prior described embodiment of FIGS. 3C-3D, the battery enables the device 110 to be used in a portable manner. Unlike the prior described embodiments, this embodiment does not necessarily require a USB interface 340 to receive electrical power from another device. The battery can be pre-charged and installed into the device 110. This feature enables the device 110 to have electrical power without a cable connection, such as a USB cable 122 connection with another device, such as the host device 150.

Figure 4A:
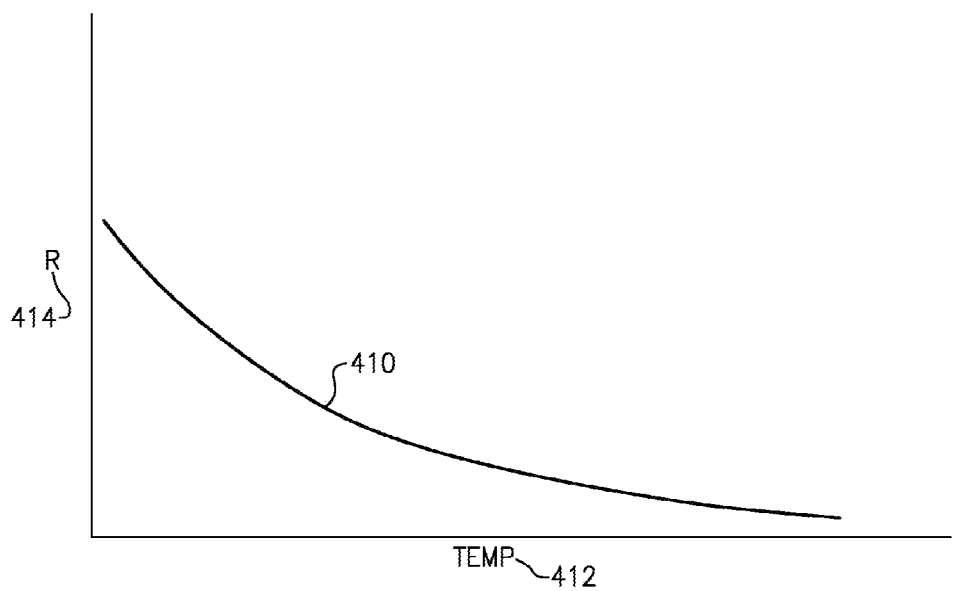
FIG. 4A illustrates a relationship between an electrical resistance of a thermistor and the temperature of that thermistor.

FIG. 4A illustrates a functional relationship 410 between an electrical resistance 414 of an embodiment of a thermistor 210 and the temperature 412 of the thermistor 210. The electrical resistance 414 is measured in ohms and temperature is measured in, for example, degrees Fahrenheit. The thermistor 210 is classified as operating in accordance with a negative temperature coefficient, meaning that the electrical resistance 414 of the thermistor 210 decreases as a function of its rising temperature 412. In other words, the higher the thermistor's temperature 412 the lower its electrical resistance 414 and the lower the thermistor's temperature 412 the higher its electrical resistance 414.

In other embodiments of the thermistor 210, the thermistor 210 can operate in accordance with a different temperature coefficient than that of the embodiment of the thermistor 210 that is associated with the relationship 410 shown. Operating in accordance with a different temperature coefficient would result in a different functional relationship between the other thermistor's temperature 412 and its electrical resistance 414. Such a temperature coefficient could equal a value that is negative (below 0.0) or in some circumstances a positive value (above 0.0).

Figure 4B:
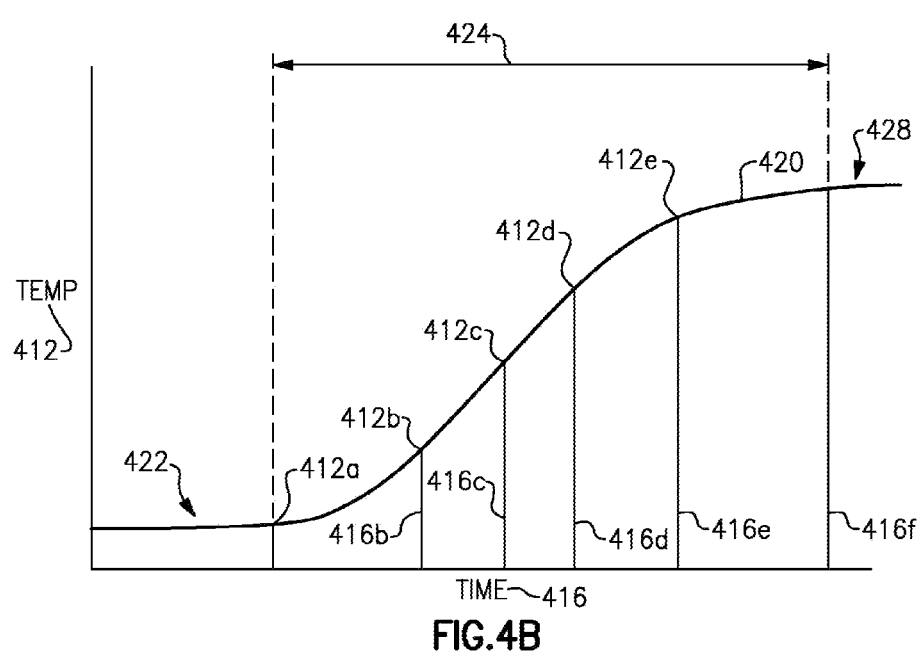
FIG. 4B illustrates a relationship between a temperature of the thermistor and time.

FIG. 4B illustrates a relationship 420 between a temperature 412 of the thermistor 210 and time 416. As shown, physical engagement of the probe tip 112a to a target site 230 having a temperature that is higher than that of the probe tip 112a, causes transfer of heat from the target site 230 to the probe tip 112a and causes an increase over a period of time 424 to the temperature 412 of the probe tip 112a and to the temperature 412 of the thermistor 220 within the probe tip 112a. The temperature of the probe tip 112a and the temperature 412 of the thermistor 210 eventually rise to an equilibrium temperature value 428 that is slightly less than or equal to the temperature of the target site 230.

As shown, the thermistor temperature 412 equals a lower temperature value 422 at time 416a and then substantially rises during a period of time 424, that is referred to as a dynamic rise time period 424. The dynamic rise time period 424 includes instances (points) in time 416a-416e that are each respectively associated with a temperature value 412a-412e of the thermistor. The dynamic rise time period 424 eventually terminates upon arriving at a thermal equilibrium temperature 428 which occurs at time 416f.

Combining the relationship illustrated in each of FIGS. 4A-4B, it is apparent that the resistance value of the thermistor 220 substantially decreases during the dynamic temperature rise time period 424 while the probe tip 112a is placed in physical contact to the target 230. The relationship between the electrical resistance value of the thermistor 220 over a period of time is recorded within circuit-measurement data.

The circuit-measurement data represents measurement of electrical characteristics of the first circuit path, including and/or indicating the resistance value 414 of the thermistor 220, as a function of time 416 and over period of time including at least a portion of the dynamic rise time 424. Temperature correlation information is employed to execute a procedure that inputs information provided by the circuit-measurement data in order to determine an estimated (predicted) temperature value of the target site 230.

The temperature correlation information provides a mapping of electrical resistance of the thermistor to a temperature of the thermistor as shown in FIG. 4A. In combination with the circuit measurement data (thermistor electrical resistance versus time data), the temperature of the thermistor versus time is determined as shown in FIG. 4B.

The temperature correlation information further includes information mapping a thermistor temperature versus time to a predicted (estimated) thermistor temperature at thermal equilibrium, and further includes information that maps a predicted thermistor temperature at thermal equilibrium to a probe temperature at thermal equilibrium and further includes information to map the probe temperature at thermal equilibrium to a target temperature.

FIG. 4C illustrates an embodiment of programming script 470 that represents a procedure, also referred to as a procedural model, that is constructed in accordance with temperature correlation information. The script 470 is a collection of digital logic that defines a procedure for processing the circuit-measurement data. The script 470 is expressed as a set of directives like that of a computer programming language and is designed to exercise, at least in part, a relationship between circuit-measurement data and an estimated (predicted) temperature of the target site 230. The circuit-measurement data is associated with a particular points in time within a period of time within which the circuit-measurement data is collected. The circuit-measurement data collection is initiated before time period 424 and terminated after time period 424.

As shown, this embodiment of script 470 employs a syntax like that of the C programming language. The script 470 defines a procedure named Temp_predict_procedure( ) 472 which is stored in the memory 324 of an embodiment of the device 110. This procedure is employed to determine an estimated (predicted) temperature of a target site 230 that is in physical contact with that embodiment of the device 110. The procedure accesses the circuit-measurement data that was collected by the device 110 while it was in physical contact with the target site 230. In some embodiments, the circuit-measurement data is accessed via a library of function calls, such as the cmd_temp( ) function call 478 that is employed in this script 470.

As shown, this procedure defines and sets initial values for (8) script variables. Of these script variables, (4) variables 474a-474d are employed as constant numerical coefficient values within a mathematical expression 480 that is exercised within the procedure to determine a value of the Temp_predict variable. The procedure 470 returns (outputs) the predicted (estimated) temperature by returning the Temp_predict_variable 482.

Of these script variables, (3) variables 476b-476d are employed as values that are each passed as a parameter to a cmd_temp( ) function 478a-478c. The cmd_temp( ) function 478a-478c extracts a temperature value from circuit-measurement data (CMD) that is associated with a time value (476b-476d) that is passed to it as a parameter. The time parameter is an offset (in seconds) within a period of time within which circuit measurement data collection occurs.

For example, cmd_temp (1.75) returns a temperature value at a point in time occurring in time 1.75 seconds after the initiation of the circuit-measurement data collection time period. Another function, cmd_time(temperature value) (not shown here) returns a time for a first and if applicable, next occurrence of a temperature value measured within the circuit-measurement data collection time period.

Other embodiments of script can obtain and process additional temperature values at different points in time from the circuit-measurement data (CMD). Furthermore, other embodiments of the script can employ other C programming constructs such a IF, ELSE and ELSE IF statements to more conditionally process circuit-measurement data (CMD) based upon values retrieved from the CMD.

Note that values of script variables, factor a difference between a temperature of the thermistor and an estimated temperature of the target site 230, based upon known design and manufacturing characteristics of the particular device 110 that is associated with and stores the script procedure 470.

An advantage of this approach is that each separately designed and manufactured device 110 can store and communicate its own customized script to a host device 150. Each customized script reflects design and manufacturing idiosyncrasies of each probed device 110. If newer and/or more effective scripts are developed in association with a particular device 110, then that newer script can be stored onto that particular device 110 and later exercised (executed) by a host device 150, in order to quickly and accurately predict a temperature of a target site 230 in physical contact with the device 110.

In accordance with the invention, via employment of a script, temperature prediction is no longer limited to an exercise of any one procedure or mathematical model that is associated with such a procedure. Entirely different procedures and/or mathematical models can be developed and exercised for a same device 110 or each customized for each of a set of different probe devices 110.

For example, a temperature estimation procedure can be upgraded and refined over time for a particular manufactured device 110, or for a classification of like designed probe devices, and varied for differently designed probe devices 110. Furthermore, a host device 150 will be able to perform temperature estimation for devices 110 that are designed and or manufactured after a commercial release of the host device 150.

FIG. 5 illustrates information exchange between the temperature probe 110, a host device 150 and an electronic medical records (EMR) system 500. The EMR system includes a repository of information (data) 502 that is implemented in some embodiments as a data base 502. Temperature measurements performed by the device 110 are communicated to and stored into the EMR system 500.

The host device 150 is designed to associate patient and time of measurement information with temperature measurements performed by the device 110. In some embodiments, the probe device performs both circuit-measurement data collection and temperature prediction, which are both communicated to the host device 150 from the device 110. In other embodiments, the device 110 performs circuit-measurement data collection that is communicated to the host device 150 from the device 110.

What is claimed is:

1. A temperature-measurement device, comprising:
a first device having a first electronic circuit, a communication node, and a memory storing a first mathematical expression, the first electronic circuit measuring electrical characteristics;
a host having a second electronic circuit and a communication channel for communication with the node and to receive the first mathematical expression and the electrical characteristics from the first electronic circuit;
wherein the host exercises the first mathematical expression and utilize a portion of the measured electrical characteristics to determine a temperature, and
wherein the host exercises a second mathematical expression in a second device interchangeable with the first device, the second mathematical expression having programmable constructs different from the first mathematical expression.

2. The temperature-measurement device of claim 1, wherein the first electronic circuit includes at least one of a resistor, a thermistor and thermopile.

3. The temperature-measurement device of claim 1, wherein the first mathematical expression is at least one of a script, computer programming language directives, and digital logic.

4. The temperature-measurement device of claim 1, wherein the communication channel is a wireless channel.

5. The temperature-measurement device of claim 1, wherein the second electronic circuit is part of a temperature-estimation device.

6. The temperature-measurement device of claim 1, wherein the first device is associated with a cradle.

7. The temperature-measurement device of claim 1, wherein the first device includes an adhesive.

8. The temperature-measurement device of claim 1, wherein the first device includes a data acquisition complete indicator.

9. The temperature-measurement device of claim 1, wherein the first electronic circuit performs acquisition and storage of the electrical characteristics while the first device is located in physical contact with a target.

10. The temperature-measurement device of claim 1, wherein the temperature approximates a temperature of a human body site.

11. A system configured to determine a temperature of a patient, comprising:
a first device having a first electronic circuit, a communication node, and a memory storing a first mathematical expression, the first electronic circuit measuring electrical characteristics; and
a host having a second electronic circuit and a communication channel for communication with the node and to receive the first mathematical expression and the electrical characteristics from the first electronic circuit,
wherein the host exercises the first mathematical expression and utilize a portion of the measured electrical characteristics to determine a temperature, and
wherein the host exercises a second mathematical expression in a second device changeable with the first device, the second mathematical expression having programming constructs different from the first mathematical expression.

12. The system of claim 11, further comprising an electronic medical records system wherein the temperature is recorded in the electronic medical records system.

13. The system of claim 12, wherein the electronic medical records system includes a repository.

14. The system of claim 11, wherein the second electronic circuit associates at least one of patient information and time information with the temperature.

15. The system of claim 14, further comprising an electronic medical records system wherein the temperature and at least one of patient information and time information is recorded in the electronic medical records system.

16. A method of manufacturing a temperature measurement device, comprising:
- providing a first device having a first electronic circuit, a communication node, and a memory;
- storing a first mathematical expression in the memory;
- configuring the first electronic circuit to measure electrical characteristics;
- providing a host having a second electronic circuit and a communication channel for communication with the node and to receive the first mathematical expression and the electrical characteristics;
- configuring the host to exercise the first mathematical expression by utilizing a portion of the measured electrical characteristics to determine a temperature;
- configuring the host to exercise a second mathematical expression in a second device switchable with the first device, the second mathematical expression having programming constructs different from the first mathematical expression.

17. The method of claim 16, further comprising the second electronic circuit to communicate the temperature to an electronic medical records system.

18. The method of claim 16, wherein the first mathematical expression includes a first set of design characteristics and the second mathematical expression includes a second set of design characteristics.

19. The method of claim 16, further comprising providing the second device with the second mathematical expression.

20. The method of claim 16, wherein the host includes a cradle, and wherein the first device is configured to communicate with the channel after the first device is associated with the cradle.

* * * * *